United States Patent [19]

Goike et al.

[11] Patent Number: 4,458,930
[45] Date of Patent: Jul. 10, 1984

[54] VEHICLE BODY CLOSURE ARRANGEMENT

[75] Inventors: Thomas J. Goike, Washington; Thomas A. Grace, Royal Oak; Bert R. Wanlass, Warren, all of Mich.

[73] Assignee: General Motors Corporation, Detroit, Mich.

[21] Appl. No.: 382,373

[22] Filed: May 27, 1982

[51] Int. Cl.³ .................. E05C 1/12; B62D 39/00
[52] U.S. Cl. ............................... 292/201; 70/279; 292/DIG. 25; 296/1 C
[58] Field of Search ............... 296/1 C; 70/279, 256, 70/257; 292/201, 144, DIG. 25, DIG. 43

[56] References Cited

U.S. PATENT DOCUMENTS

| 2,325,225 | 7/1943 | Burke | 292/201 X |
| 2,729,500 | 1/1956 | Dickenshied et al. | 296/1 C |
| 3,580,623 | 5/1971 | Peters | 292/201 |
| 3,912,322 | 10/1975 | Weaver | 296/1 C |
| 3,915,491 | 10/1975 | Montgomery | 292/201 X |
| 3,924,427 | 12/1975 | San Juaquin | 292/144 X |
| 3,954,016 | 5/1976 | Sarosy et al. | 74/29 |
| 4,262,830 | 4/1981 | Haves | 292/201 X |
| 4,277,094 | 7/1981 | Roue | 296/1 C |

Primary Examiner—Gary L. Smith
Assistant Examiner—R. Illich
Attorney, Agent, or Firm—Herbert Furman

[57] ABSTRACT

A fuel tank filler door mounts a striker which is engageable by a latch member of a lock on the body to lock the filler door against movement to open position. The lock is released by a shiftable cable controlled by a power actuator or a mechanical actuator within the vehicle trunk.

2 Claims, 10 Drawing Figures

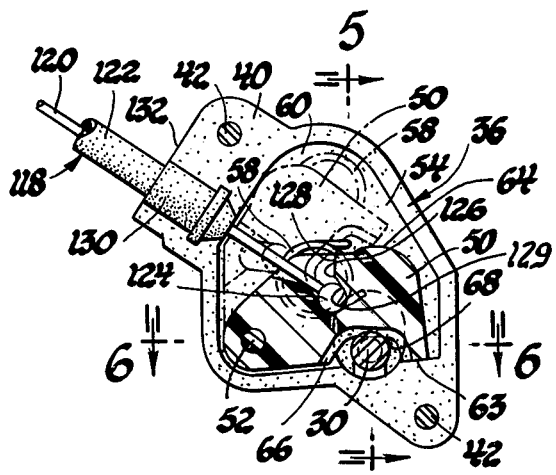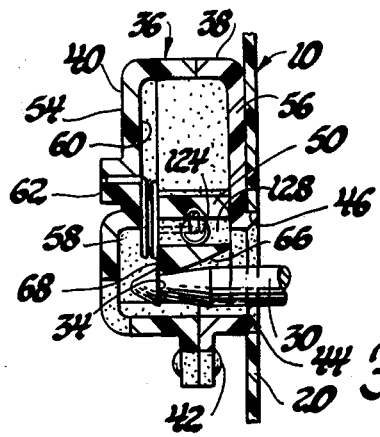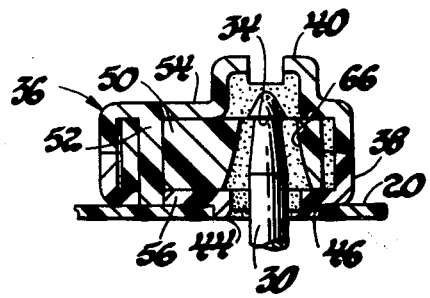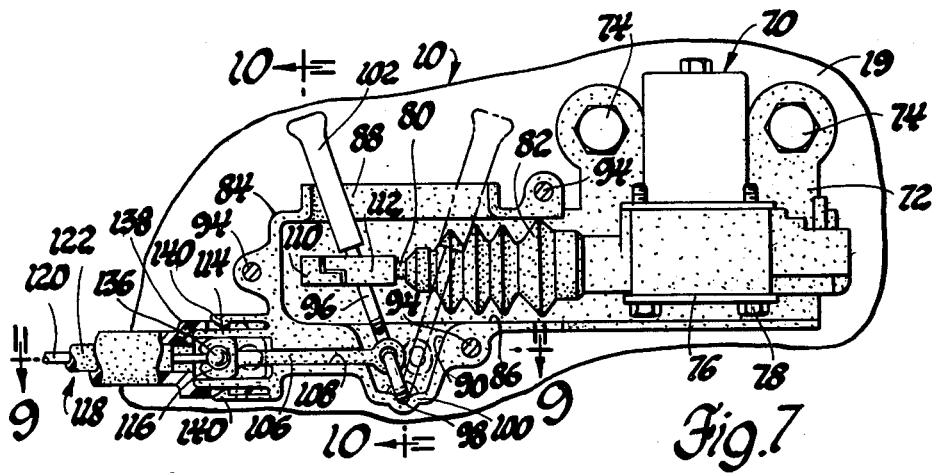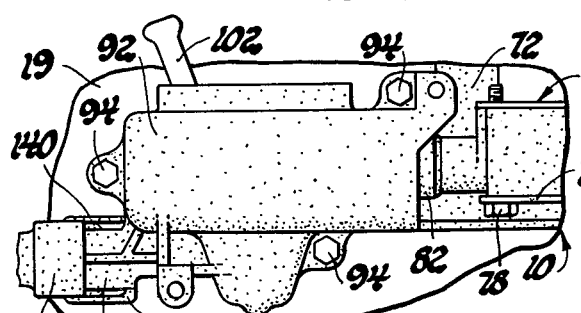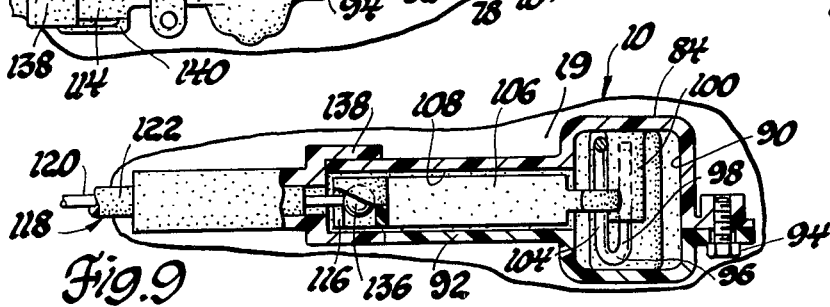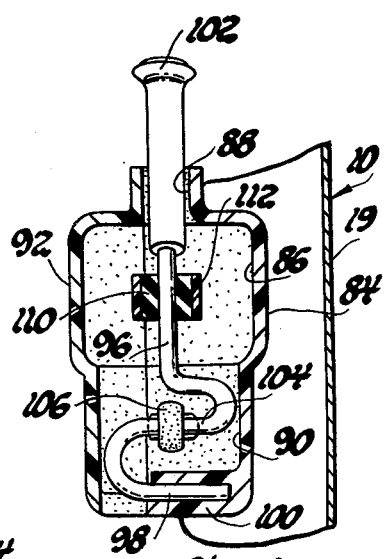

VEHICLE BODY CLOSURE ARRANGEMENT

This invention relates generally to vehicle body closure arrangements and more particularly to an improved arrangement controlling movement of a fuel tank filler door to released position to provide access to a fuel tank filler neck.

It is known in vehicle bodies to provide an access door to a fuel tank inlet or filler neck which is normally located within either the quarter panel area of the body or the rear area of the body. It is also known to provide such a filler door with either a key operated latch operable from outside the body or with some type of releasable latch, operable from the inside of the body by a power operator, such as a solenoid, or by a manual operator, such as a cable.

The preferred embodiment of this invention incorporates the conventional compartment in the rear area of the vehicle body which houses the fuel tank filler neck. This compartment is provided by a license plate panel which is mounted to the rear end panel of the body in spaced relationship thereto and is opened and closed by a conventional closure or filler door pivoted thereto and biased to closed position. The door also mounts the vehicle license plate. The filler door mounts a headed striker pin which projects therefrom through the license plate panel. A latch on the license plate panel includes a latch member movable between locked and unlocked positions with respect to the striker to lock the filler door or release the filler door for manual movement to open position to permit access to the fuel tank filler neck. The latch member is selectively and alternately spring biased to either locked or unlocked position and is movable against the spring bias by a shiftable cable operable by either a power actuator or a manual actuator located in the trunk or deck compartment of the vehicle. The manual actuator provides the operative connection between the cable and the power actuator. The power actuator is normally operable remotely from the deck compartment. However, should the power actuator be inoperable for any reason, the deck lid can be opened and the manual operator actuated to move the latch member to either position. Since the deck lid is normally locked, access cannot be obtained to the manual actuator unless the deck lid is first unlocked.

It is therefore a primary object of this invention to provide an improved vehicle body closure arrangement for controlling access to a first compartment by a remotely actuatable power actuator and a directly actuatable manual operator located in a second adjacent compartment. Another object is to provide such an arrangement wherein the first compartment houses a fuel tank inlet and is normally closed by a releasable cover, the release of which is controlled by the power actuator and the manual operator located in the adjacent vehicle body trunk or deck compartment. A further object is to provide such an arrangement wherein the cover for the first compartment includes a striker which is engaged and released by a latch member which is selectively movable to released position by actuation of the power actuator or the manual operator.

These and other objects will be readily apparent from the following specification and drawings wherein:

FIG. 4 is a view taken generally along the plane indicated by line 4—4 of FIG. 3.

FIG. 5 is a sectional view taken generally along line 5—5 of FIG. 4.

FIG. 6 is a sectional view taken generally along line 6—6 of FIG. 4.

FIG. 7 is an enlarged partially broken away view taken generally along line 7—7 of FIG. 1.

FIG. 8 is a view in elevation of a portion of FIG. 7.

FIG. 9 is an enlarged sectional view taken generally along line 9—9 of FIG. 7, and FIG. 10 is an enlarged sectional view taken generally along line 10—10 of FIG. 7.

Figure 1:
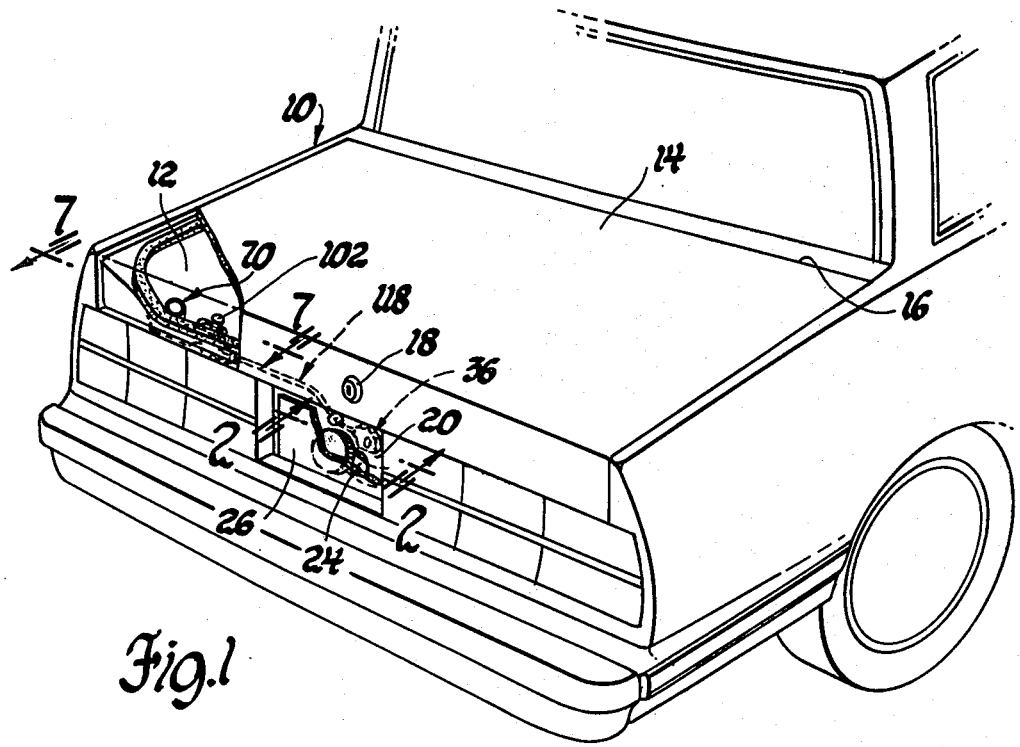
FIG. 1 is a partial rear perspective view of a vehicle body incorporating a vehicle body closure arrangement according to this invention, with parts thereof broken away.

Referring now particularly to FIG. 1 of the drawings, a vehicle designated generally 10 includes a rear trunk or deck compartment 12 which is opened and closed by a rear deck lid or trunk lid 14 which is hinged to the body 10 adjacent its forward edge 16 and locked thereto adjacent its rearward edge in a conventional manner by a rear deck lid lock releasable from the exterior of the body by a key cylinder 18. As is known, the rear deck lid lock may also be released by a power release mechanism remotely operated by the driver or passenger or operated through the key cylinder.

The rear end panel of the body or wall 19 of compartment 12 mounts a license plate panel 20 which provides a rearwardly opening second compartment 22 for the fuel tank filler neck or inlet 24. Panel 20 is mounted in spaced relationship to the outside of panel 19 by brackets, not shown. Compartment 22 is opened and closed by a filler door or closure 26 which is pivoted by conventional hinges 28 for movement between a closed position as shown and an open position wherein the closure 26 swings rearwardly and downwardly to provide access to the inlet 24. The closure 26 is spring biased to closed position. The foregoing structure is in current production use on vehicles manufactured by the assignee of this invention and therefore only a general description sufficient for an understanding of the invention has been given.

Figure 2:
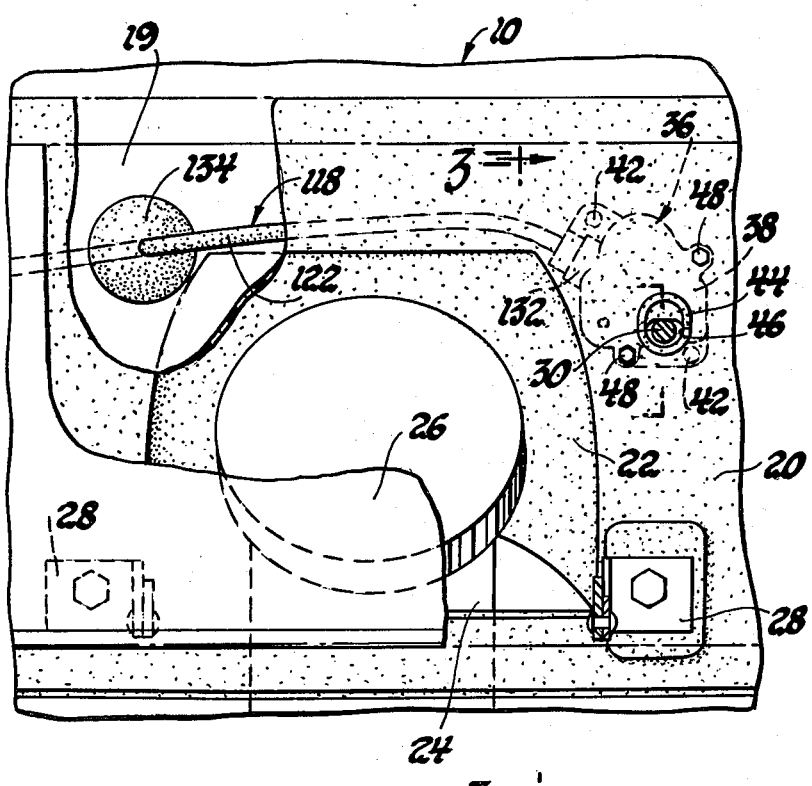
FIG. 2 is an enlarged partially broken away view taken generally along line 2—2 of FIG. 1.
Figure 3:
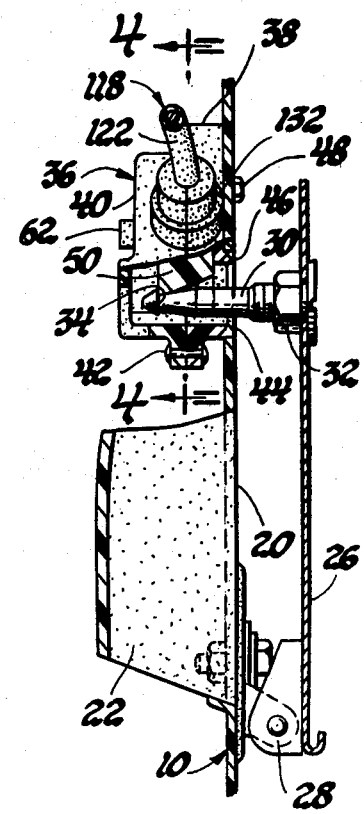
FIG. 3 is an enlarged sectional view taken generally along line 3—3 of FIG. 2.

In accordance with this invention, a headed striker 30 projects forwardly through an aperture in the closure 26 and is secured to the closure by a nut 32 which is threaded on a threaded shank of the striker to clamp the closure between the nut and the head of the striker. The striker includes a tapered undercut portion adjacent the free end thereof which provides a locking shoulder 34. A lock 36 is located forwardly of panel 20 and rearwardly of wall 19 and includes a housing comprised of two molded plastic housing members 38 and 40 having mating abutting peripheral walls and abutting ears riveted to each other at 42. The housing member 38 includes an oval shaped flange 44 which fits within a similar shaped opening 46 in panel 20, FIGS. 2, 5 and 6, and receives the free end portion of the striker 30 as shown in FIGS. 3, 4 and 5, when the closure 26 is in the closed position. The housing member 38 has mounting ears bolted at 48 to panel 20 to mount the lock 36 thereon. The lock 36 further includes a latch member 50. The latch member is pivotally mounted on a shaft or pin 52 which is formed integrally with the base wall 54 of the housing member 40 and extends through an aperture in the base wall 56 of the housing member 38 as shown in FIG. 6. The latch member 50 is slidably guided by the base walls 54 and 56 of the housing members 40 and 38 as it moves between a locked position shown in FIGS. 3 through 6 and an unlocked position shown in dash lines in FIG. 4. The latch member 50 is alternately biased to each position by an overcenter type spring 58 housed within a recess 60 of wall 54 and engaged between the latch member 50, FIG. 5, and an apertured extension 62. The latch member is located in the locked and unlocked positions by the respective engagement of shoulders 63 and 64 of the peripheral wall thereof with the peripheral wall of the housing member 40 as shown in FIG. 4. As best shown in FIG. 5, the latch member 50 includes a tapered opening 66 which provides a shoulder 68 for engagement with the shoulder 34 of the striker 30 when the latch member 50 is in the locked position to thereby lock the closure 26 in closed position and prevent access to the compartment 22 and to the fuel tank inlet 24.

The latch member 50 is moved between its locked and unlocked positions by a power actuator designated generally 70 and located in compartment 12. The details of the power actuator are not shown and reference may be had to Sarosy et al. U.S. Pat. No. 3,954,016, Door Lock Actuator, issued May 4, 1976, and assigned to the assignee of this invention for such details. The actuator 70 is mounted to the inside of wall 19 of the compartment 12 by a molded L-shaped plastic bracket 72 having one leg thereof bolted at 74 to the wall 19. The actuator is bolted to this one leg of bracket 72 by an L-shaped metal bracket 76, one leg of which is screwed at 78 to the actuator and the other leg of which is secured to the one leg of the bracket 72, not shown. The screws 78 are the same as the screws 86 shown in the aforementioned Sarosy patent. The piston rod 80 of the actuator and the bellows 82 are the same as the piston rod 102 and bellows 106 of the unit shown in the aforenoted Sarosy patent and are housed within an elongated housing 84 of bracket 72. The housing 84 includes an elongated cavity 86 having an elongated upper flanged opening 88 and a lower frustoconical shaped cavity 90. The housing 84 is formed of an inner portion integral with bracket 72 and an outer portion provided by a cover 92, FIGS. 8, 9 and 10 bolted thereto at 94.

A rod 96 includes a lower S-shaped portion which is received within the cavity 90 and has one leg 98 thereof pivotally and slidably received within an apertured boss 100 at the apical portion of the cavity 90 to mount the rod 96 for movement between a full line latch member locked position and a dotted line latch member unlocked position as shown in FIG. 7. The upper end of the rod projects outwardly through the opening 88 and mounts a conventional garnish button 102. An intermediate leg 104 of the rod receives the integral eyelet end of a shiftable member 106 of flattened O shape cross-section, FIGS. 7, 9 and 10 which is slidable within a like shaped bore 108 of the housing 84. Bore 108 is formed of an open slot in the inner portion of the housing which is closed by cover 92. The rod 96 also extends through an opening in an elastomeric bushing 110 fitted within an integral eyelet portion 112 of the piston rod 80 to couple the actuator to the rod.

The housing 84 further includes an integral square shaped cross-section extension 114 which slidably receives an open eyelet end 116 of the member 106. Extension 114 is formed of an open slot in the inner portion of housing 84 which is closed by cover 92.

A cable assembly 118 includes an inner cable or wire 120 which is slidably received in a flexible plastic sheath 122. The wire 120 mounts a transverse pin 124 at one end thereof, FIG. 4, which is received within a closed transverse slot 126 of the latch member 50 to secure the wire 120 to the latch member. A tapered slot 128 opens to slot 126 and the peripheral wall of the latch member and receives wire 120. A transverse slot 129 provides for assembly of the wire and pin 124 to the latch member. The sheath 122 includes an end fitting 130 which is clamped within a boss 132 of the housing formed by semi-cylindrical portions of the housing member 38 and 40. A gasket 134 is slidably mounted exteriorly of the sheath and provides a seal for passage of the sheath and cable through the wall 19.

The other end of the cable mounts a ball 136 which is received within the open eyelet end 116 of member 106. A box fitting 138 which is formed as part of the sheath 122 includes a pair of apertured legs which straddle the upper and lower walls of the extension 114 and are releasably secured thereto by integral deflectable legs 140 of such extension.

From the foregoing description it can be seen that the latch member 50 is moved between its locked position as shown in full lines in FIG. 4 and its unlocked position shown in dash lines therein by shifting movement of the wire 120 within sheath 122 and overcenter movement of spring 58. During this movement of the wire 120, the member 106 shifts within bore 108 concurrently with pivotal movement of rod 96 and button 102 between their full line positions and their dash line positions shown in FIG. 7. This movement can occur upon electrical actuation of the actuator 70 from within the vehicle by either the driver or front seat passenger through a suitable switch and circuit arrangement connecting the motor to the vehicle battery as set forth in the aforenoted patent.

The overcenter spring 58 ensures that the latch member 50 is located either in its locked or unlocked position and not in any intermediate position. When the closure 26 is moved from the open to the closed position, the engagement of the striker 30 with the latch member 50 moves the latch member partially toward the unlocked position but the spring 58 does not go overcenter. Should the spring 58 go overcenter for any reason, the spring has sufficient strength to shift the wire 120 within the sheath 122 and drive the actuator 70 through the member 106 and rod 96.

In the event that the actuator 70 becomes inoperable for any reason whatsoever, the deck lid lock can be released to open the deck lid 14. The operator can then manually grasp the button 102 and move the button and rod 96 between its full line and dash line positions to selectively move the latch member 50 between its locked and unlocked positions and thereby either engage the latch member with the striker 30 or release the striker for movement of the closure 24 to open position. Manual operation can occur even though the actuator 70 is operative since the rod 80 of this actuator is easily movable at any time and access may be desired to the fuel tank inlet 22 without having to require the operator or passenger to reenter the vehicle to operate the switch controlling operation of the actuator 70.

Thus this invention provides an improved vehicle body closure arrangement.

The embodiments of the invention in which an exclusive property or privlege is claimed are defined as follows:

1. A vehicle body closure arrangement comprising, in combination, a vehicle body trunk having a lockable trunk lid controlling access thereto, a fuel tank inlet compartment exterior of the truck and including a wall spaced from a wall of the trunk and having an opening therethrough, a door movable between open and closed positions with respect to the inlet compartment, a striker on the door projecting through the opening in the wall of the inlet compartment when the door is in closed position, a latch housing mounted in the space between the wall of the trunk and the wall of the inlet compartment and having an opening generally aligned with the opening through the wall of the inlet compartment for receipt of the striker, a latch member mounted within the housing for movement between engaged and released positions with respect to the striker to selectively and alternately lock the door against movement to open position or release the door for movement to open position and access to the inlet compartment, spring means biasing the latch member alternately to engaged or released positions, cooperating stop means on the latch member and the housing locating the latch member in engaged or released position against the bias of the spring means, a shiftable member extending from the trunk into the housing and operatively connected to the latch member for moving the latch member to engaged or released positions, a power actuator within the trunk including a movable portion, a manually operable member pivoted within the trunk and having one portion thereof operatively connected to the movable portion of the actuator and another spaced portion thereof operatively connected to the shiftable member for shifting the shiftable member upon pivoting of the manually operable member or actuation of the actuator, the manually operable member being manually accessible upon unlocking of the trunk lid to provide for manual shifting movement of the shiftable member and movement of the latch member.

2. A vehicle body closure arrangement comprising; in combination, a vehicle body trunk having a lockable trunk lid controlling access thereto, a fuel tank inlet compartment exterior of the trunk and including a wall spaced from a wall of the trunk and having an opening therethrough, a door movable between open and closed positions with respect to the inlet compartment, a headed striker pin on the door having the head thereof projecting through the opening in the wall of the inlet compartment when the door is in closed position, a latch housing mounted in the space between the walls of the trunk and inlet compartment and having an opening generally aligned with the opening through the wall of the inlet compartment for receipt of the striker pin head, a latch member mounted within the housing for movement laterally of the striker pin between engaged and released positions with respect to the striker pin head to selectively and alternately lock the door against movement to open position or release the door for movement to open position and access to the inlet compartment, an over center spring biasing the latch member alternately to engaged or released positions, cooperating stop means on the latch member and the housing locating the latch member in engaged or released position against the bias of the spring, a shiftable member extending from the trunk into the housing and operatively connected to the latch member for moving the latch member to engaged or released positions, a power actuator within the trunk including a movable portion, a manually operable member pivoted within the trunk and having spaced portions thereof operatively connected to the movable portion of the actuator and to the shiftable member for shifting the shiftable member upon pivoting of the manually operable member or actuation of the actuator, the manually operable member being manually accessible upon unlocking of the truck lid to provide for manual shifting movement of the shiftable member and movement of the latch member.

* * * * *